W. McARTHUR.
GAS SEPARATOR.
APPLICATION FILED JAN. 15, 1909.
954,454.
Patented Apr. 12, 1910.
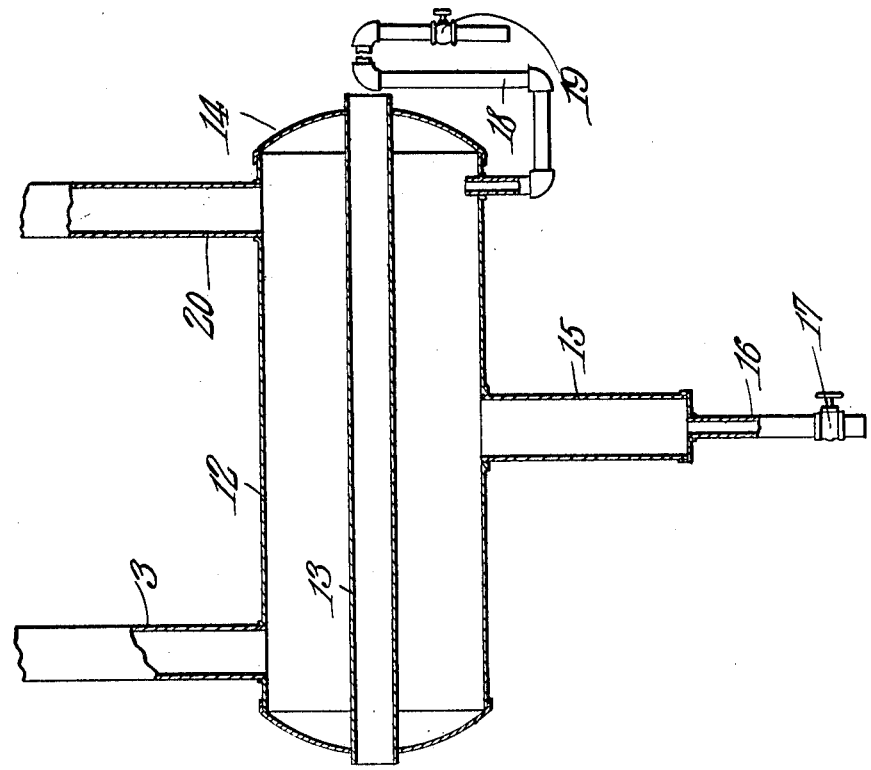
Witnesses
Inventor
William McArthur.
By C. A. Snow & Co.
Attorneys

UNITED STATES PATENT OFFICE.

WILLIAM McARTHUR, OF TENINO, WASHINGTON.

GAS-SEPARATOR.

954,454.  Specification of Letters Patent.  Patented Apr. 12, 1910.

Application filed January 15, 1909. Serial No. 472,518.

*To all whom it may concern:*

Be it known that I, WILLIAM MCARTHUR, a citizen of the United States, residing at Tenino, in the county of Thurston and State of Washington, have invented a new and useful Gas-Separator, of which the following is a specification.

This invention has reference to improvements in means for manufacturing gas and is designed to provide a means for use in manufacturing gas from lignite, more particularly of the type found in the northwestern part of the United States, though not necessarily confined to this particular type of lignite.

The invention comprises a separator in which the heavier distillates are separated from the gases, the said separator comprising a casing with a passage therethrough for a cooling medium which passage is open at the ends to the atmosphere, there being gas inlet and outlet pipes communicating with the top of the casing and a valved discharge pipe communicating with the bottom of the casing and also a valved siphon pipe also communicating with the casing.

The invention will be best understood from a consideration of the following detail description taken in connection with the accompanying drawings forming a part of this specification, in which drawings there is shown a longitudinal diametric section of a separator constructed in accordance with the present invention, some of the parts being shown in elevation.

Referring to the drawings, there is shown a casing 12, preferably cylindrical in cross section, and longitudinally through this casing there is extended a pipe 13 supported near the ends in heads 14 constituting the ends of the casing, the ends of the pipe 13 being open to the atmosphere. Near one end of the casing there is provided an inlet pipe 3 for gases and near the other end of the casing there is provided a like outlet pipe 20, both of these pipes being located at the top of the casing. At an intermediate point, but communicating with the bottom of the casing there is another pipe 15 and from the bottom of this pipe there leads a smaller pipe 16 terminating in a valve 17. Leading from the casing 12 there is a siphon pipe 18 terminating in a valve 19.

In the following description of the operation of the device described it is assumed that gas is being manufactured from the kind of lignite mentioned, which lignite contains from fifteen to twenty per cent. of water. As soon as the apparatus is underway then the products of distillation find their way into the separator where the cold air passing through the pipe 13, this pipe being shown as horizontal, sufficiently chills the products of distillation so that the tarry matters and also the greater portion of the water is condensed within the separator while the lighter products of distillation pass on out through the pipe 20 to be further treated as necessary. The greater portion of the water of the lignite is condensed within the separator 12 and absorbs the ammonia carried over and this water may be withdrawn from time to time through the siphon 18 while the heavier products of distillation, such as the tars and creosote, may be withdrawn through the valve 17 at such intervals as may be found necessary. It is to be noted that the gas coming from the retort does not pass through water in the separator, and the only water in the said separator is that which results from condensation. There is therefore a saving of gases which are soluble in water and which, when the gases are caused to pass through water, are withdrawn from the gas and their values are lost when the gas is used for illuminating or heating purposes.

Of course the tars and other impurities which are extracted from the gas in the separator may be utilized for the manufacture of valuable products, the sale of which will pay the expenses of running the plant.

The separator is of very simple construction and readily managed, while in practice it is found efficient in operation especially in connection with gas plants where the gas is made from lignite such as found in the localities mentioned.

What is claimed is:—

1. In a means for the manufacture of gas from lignite, a separator consisting of a casing having a passage for a cooling medium extending therethrough and open at the ends to the atmosphere, inlet and outlet pipes communicating with the top of the casing, a valved discharge pipe communicating with the bottom of the casing, and a valved siphon pipe also communicating with the casing.

2. In a means for the manufacture of gas from lignite, a separator consisting of a horizontally disposed casing having a passage for a cooling medium extending axially therethrough and open at the ends to the atmosphere, inlet and outlet pipes communicating with the top of the casing, a valved discharge pipe communicating with the bottom of the casing, and a valved siphon pipe also communicating with the bottom of the casing.

In testimony that I claim the foregoing as my own, I have hereto affixed my signature in the presence of two witnesses.

WILLIAM McARTHUR.

Witnesses:
   H. P. Scheel,
   P. C. Kibbe.